United States Patent
Brown et al.

(10) Patent No.: US 7,330,588 B2
(45) Date of Patent: *Feb. 12, 2008

(54) IMAGE METRICS IN THE STATISTICAL ANALYSIS OF DNA MICROARRAY DATA

(75) Inventors: Carl S. Brown, Seattle, WA (US); Paul C. Goodwin, Shoreline, WA (US)

(73) Assignee: Applied Precision, LLC, Issaquah, WA (US)

( * ) Notice: Subject to any disclaimer, the term of this patent is extended or adjusted under 35 U.S.C. 154(b) by 666 days.

This patent is subject to a terminal disclaimer.

(21) Appl. No.: 10/949,270

(22) Filed: Sep. 23, 2004

(65) Prior Publication Data

US 2005/0117790 A1    Jun. 2, 2005

Related U.S. Application Data

(63) Continuation of application No. 09/770,833, filed on Jan. 25, 2001, now Pat. No. 6,862,363.

(51) Int. Cl.
G06K 9/34     (2006.01)
(52) U.S. Cl. .................... 382/173; 382/228
(58) Field of Classification Search ........ 382/128–134, 382/159–160, 254, 274, 218, 228, 173, 168–169, 382/172, 143, 224, 190; 435/6, 29; 600/410; 702/19, 179; 700/51; 73/156; 356/237.1
See application file for complete search history.

(56) References Cited

U.S. PATENT DOCUMENTS

| | | | |
|---|---|---|---|
| 5,208,870 A * | 5/1993 | Ennis | 382/143 |
| 6,245,517 B1 * | 6/2001 | Chen et al. | 435/6 |
| 6,251,601 B1 * | 6/2001 | Bao et al. | 435/6 |
| 6,285,449 B1 * | 9/2001 | Ellingson et al. | 356/237.1 |
| 6,319,682 B1 * | 11/2001 | Hochman | 435/29 |
| 6,404,925 B1 * | 6/2002 | Foote et al. | 382/224 |
| 6,411,741 B1 * | 6/2002 | Hamamura et al. | 382/254 |
| 6,564,082 B2 * | 5/2003 | Zhu | 600/410 |
| 6,751,354 B2 * | 6/2004 | Foote et al. | 382/224 |
| 7,031,523 B2 * | 4/2006 | Comaniciu et al. | 382/190 |

* cited by examiner

Primary Examiner—Ishrat Sherali
(74) Attorney, Agent, or Firm—Pillsbury Winthrop Shaw Pittman LLP

(57) ABSTRACT

Expression profiling using DNA microarrays is an important new method for analyzing cellular physiology. In "spotted" microarrays, fluorescently labeled cDNA from experimental and control cells is hybridized to arrayed target DNA and the arrays imaged at two or more wavelengths. Statistical analysis is performed on microarray images and show that non-additive background, high intensity fluctuations across spots, and fabrication artifacts interfere with the accurate determination of intensity information. The probability density distributions generated by pixel-by-pixel analysis of images can be used to measure the precision with which spot intensities are determined. Simple weighting schemes based on these probability distributions are effective in improving significantly the quality of microarray data as it accumulates in a multi-experiment database. Error estimates from image-based metrics should be one component in an explicitly probabilistic scheme for the analysis of DNA microarray data.

21 Claims, 2 Drawing Sheets

IMAGE METRICS IN THE STATISTICAL ANALYSIS OF DNA MICROARRAY DATA

CROSS-REFERENCE TO RELATED APPLICATIONS

This application is a continuation of U.S. application Ser. No. 09/770,833, filed Jan. 25, 2001, now U.S. Pat. No. 6,862,363 entitled "IMAGE METRICS IN THE STATISTICAL ANALYSIS OF DNA MICROARRAY DATA," the disclosure of which is hereby incorporated herein by reference in its entirety.

TECHNICAL FIELD

Aspects of the present invention relate to DNA microarray analysis, and more particularly to systems and methods using error estimates from image based metrics to analyze microarrays.

BACKGROUND

Large-scale expression profiling has emerged as a leading technology in the systematic analysis of cell physiology. Expression profiling involves the hybridization of fluorescently labeled cDNA, prepared from cellular mRNA, to microarrays carrying up to $10^5$ unique sequences. Several types of microarrays have been developed, but microarrays printed using pin transfer are among the most popular. Typically, a set of target DNA samples representing different genes are prepared by PCR and transferred to a coated slide to form a 2-D array of spots with a center-to-center distance (pitch) of about 200 μm. In the budding yeast S. cerevisiae, for example, an array carrying about 6200 genes provides a pan-genomic profile in an area of 3 cm² or less. mRNA samples from experimental and control cells are copied into cDNA and labeled using different color fluors (the control is typically called green and the experiment red). Pools of labeled cDNAs are hybridized simultaneously to the microarray, and relative levels of mRNA for each gene determined by comparing red and green signal intensities. An elegant feature of this procedure is its ability to measure relative mRNA levels for many genes at once using relatively simple technology.

Computation is required to extract meaningful information from the large amounts of data generated by expression profiling. The development of bioinformatics tools and their application to the analysis of cellular pathways are topics of great interest. Several databases of transcriptional profiles are accessible on-line and proposals are pending for the development of large public repositories. However, relatively little attention has been paid to the computation required to obtain accurate intensity information from microarrays. The issue is important however, because microarray signals are weak and biologically interesting results are usually obtained through the analysis of outliers. Pixel-by-pixel information present in microarray images can be used in the formulation of metrics that assess the accuracy with which an array has been sampled. Because measurement errors can be high in microarrays, a statistical analysis of errors combined with well-established filtering algorithms are needed to improve the reliability of databases containing information from multiple expression experiments.

The foregoing and other features and advantages of the invention will become more apparent upon reading the following detailed description and upon reference to the accompanying drawings.

BRIEF DESCRIPTION OF THE DRAWING FIGURES

DETAILED DESCRIPTION

The present invention involves the process of extracting quantitatively accurate ratios from pairs of images and the process of determining the confidence at which the ratios were properly obtained. One common application of this methodology is analyzing cDNA Expression Arrays (microarrays). In these experiments, different cDNA's are arrayed onto a substrate and that array of probes is used to test biological samples for the presence of specific species of mRNA messages through hybridization. In the most common implementation, both an experimental sample and a control sample are hybridized simultaneously onto the same probe array. In this way, the biochemical process is controlled for throughout the experiment. The ratio of the experimental hybridization to the control hybridization becomes a strong predictor of induction or repression of gene expression within the biological sample.

The gene expression ratio model is essentially, $$\text{Expression\_Ratio} = \frac{\text{Experiment\_Expression}}{\text{Wild} - \text{type\_Expression}} \quad \text{Equation 1}$$

In typical fluorescent microarray experiments, levels of expression are measured from the fluorescence intensity of fluorescently labeled experiment and wild-type DNA. A number of assumptions are made about the fluorescence intensity, including: 1) the amount of DNA bound to a given spot is proportional to the expression level of the given gene; 2) the fluorescence intensity is proportional to the concentration of fluorescent molecules; and 3) the detection system responds linearly to fluorescence.

By convention, the fluorescent intensity of the experiment is called "red" and the wild-type is called "green." The simplest form of the gene expression ratio is $$R = \frac{r}{g} \quad \text{Equation 2}$$

where r and g represent the number of experiment and control DNA molecules that bind to the spot. R is the expression ratio of the experiment and control.

In real situations, however, r and g are unavailable. The measured values, $r_m$ and $g_m$, include an unknown amount of background intensity that consists of background fluorescence, excitation leak, and detector bias. That is, $$r_m = r + r_b \quad \text{Equation 3}$$

$$g_m = g + g_b \quad \text{Equation 4}$$

where $r_b$ and $g_b$ are unknown amounts of background intensity in the red and green channels, respectively.

Including background values, the gene expression ratio becomes:

$$R = \frac{r_m - r_b}{g_m - g_b} \quad \text{Equation 5}$$

Figure 1:
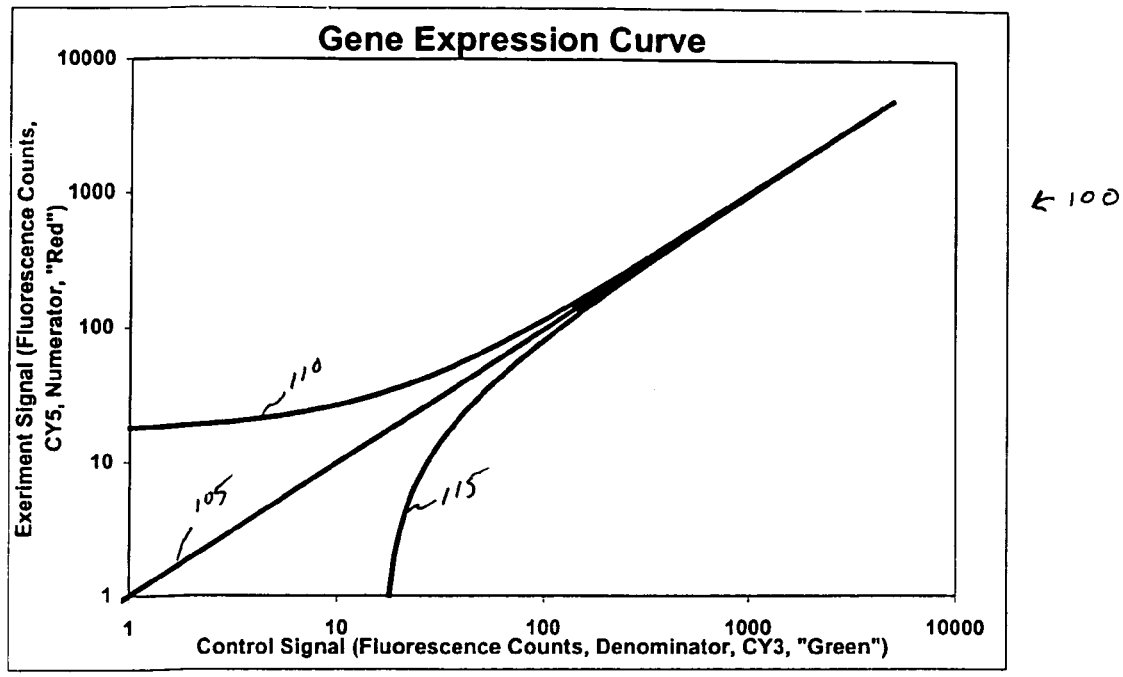
FIG. 1 is a gene expression curve according to one embodiment of the present invention.

Equation 5 shows that solving the correct ratio R requires knowledge of the background intensity for each channel. The importance of determining the correct background values is especially significant when $r_m$ and $g_m$ are only slightly above than $r_b$ and $g_b$. For example, the graph 100 in FIG. 1 shows the effect of a ten count error in determining $r_b$ or $g_b$, in the case where R is known to be one. The expected result is shown as line 105. A ten count error in the denominator is shown as line 110. A ten count error in the numerator is shown as 115.

In experimental situations, the sensitivity of the gene expression ratio technique can be limited by background subtraction errors, rather than the sensitivity of the detection system. Accurate determination of $r_b$ and $g_b$ is thus a key part of measuring the ratio of weakly expressed genes.

Rearranging equation 5, gives $$r_m = R(g_m - g_b) + r_b = Rg_m + k \quad \text{Equation 6}$$

Where $$k = r_b - Rg_b. \quad \text{Equation 7}$$

Least squares curve-fit of equation 6 can be used to obtain the best-fit values of R and k, assuming that $r_b$ and $g_b$ are constant for all spot intensities involved with the curve-fit. The validity of this assumption depends upon the chemistry of the microarray. Other background intensity subtraction techniques, however, can have more severe limitations. For example, the local background intensity is often a poor estimate of a spot's background intensity.

Two approaches have been taken to the selection of spots involved with the background curve-fit. Since most microarray experiments contain thousands of spots, of which only a very small percent are affected by the experiment, it is probably best to curve-fit all spots in the microarray to equation 6. A refinement of this method is to use all spots that have no process control defects. Another alternative is to include ratio control spots within the array and use only those for curve fittings. The former two are preferred, because curve fitting either the entire array or at least much of it yields a strong statistical measurement of the background values. In the case where the experiment affects a large fraction of spots, however, it may be necessary to use ratio control spots.

Constant k is interesting because it consists of a linear combination of all three desired values. While it is not possible to determine unique values of $r_b$ and $g_b$ from the curve-fit, there are types of constraints that can be used to select useful values. First, the background values must be greater than the bias level of the detection system and less than the minimum values of the measured data. That is, Constraint 1:

$$r_{bias} \leq r_b \leq r_{m_{min}} \quad \text{Equation 8}$$

$$g_{bias} \leq g_b \leq g_{m_{min}} \quad \text{Equation 9}$$

The second type of constraint is based on the gene expression model. For genes that are unaffected by the experiment and are near zero expression, both the experiment and the control expression level should reach zero simultaneously. In mathematical terms, when $r \to 0$, then $g \to 0$. A linear regression of $(r_m - r_b)$ versus $(g_m - g_b)$ should then yield a zero intercept. That is, selection of appropriate $r_b$, $g_b$ should yield linear regression of $$(r_m - r_b) = m(g_m - g_b) + b \quad \text{Equation 10}$$

such that b is approximately zero. This occurs when $$b = mg_b - r_b \quad \text{Equation 11}$$

The pair of values $r_b$ and $g_b$ that create a zero intercept of the linear regression is thus the second constraint that can be used for extracting the background subtraction constants. Solving equations 7 and 11 for $g_b$ gives Constraint 2:

$$g_b = \frac{k + b}{m - R} \quad \text{Equation 12}$$

where R and k come from the best-fit of 6, and m and b come from linear regression of 10. The background level $r_b$ can then be calculated by inserting $g_b$ into equation 7 or 11.

Although it is almost always possible to generate a curve-fit of the microarray spot intensities, it is not always possible to satisfy constraints 1) and 2), especially at the same time. Failure to satisfy constraint 1) is an indication that the experiment does not fit the expected ratio model or that one of the linearity assumptions is untrue.

A somewhat trivial explanation of a failure to satisfy the constraints is that the spot intensities have been incorrectly determined. A common way that this happens is that the spot locations are incorrectly determined during the course of analysis.

Under ideal circumstances, one would also expect that the linear regression slope, m, should equal the best-fit ratio R. This can also be used as a measure of success. At the same time, the linear regression intercept b should equal zero when the $r_b$ and $g_b$ meet constraint 1).

Ratio Distribution Statistics

The measured values of the numerator and denominator are random variables with mean and variance. That is, $$r_m - r_b = \bar{r} \pm r_{SD}$$

$$g_m - g_b = \bar{g} \pm g_{SD} \quad \text{Equation 13}$$

where $\bar{r}$ and $\bar{g}$ are mean values and $r_{SD}$ and $g_{SD}$ are standard deviations of r and g. The ratio R of r and g is then a random variable too with an expected value $R_E$ and variance $R_{SD}$. That is, $$R = R_E \pm R_{SD} = \frac{\bar{r} \pm r_{SD}}{\bar{g} \pm g_{SD}} \quad \text{Equation 14}$$

Assuming that the measurement of numerator and denominator are normally distributed variables, an estimate of $R_E$ and $R_{SD}$ can be formed from Taylor series expansion.

$$R_E \approx \frac{\bar{r}}{\bar{g}} + g_{SD}^2 \frac{\bar{r}}{\bar{g}^3} - \frac{\sigma_{rg}}{\bar{g}^2} \quad \text{Equation 15}$$

-continued $$R_{SD} \approx \sqrt{g_{SD}^2 \frac{\bar{r}^2}{\bar{g}^4} + \frac{r_{SD}^2}{\bar{g}^2} - 2\sigma_{rg}\frac{\bar{r}}{\bar{g}^3}}$$ Equation 16 where $\sigma_{rg}$ is the covariance of the numerator and denominator summed over all image pixels in the spot.

$$\sigma_{rg} = \frac{1}{n}\sum_{i=1}^{n}(r_i - \bar{r})(g_i - \bar{g})$$ Equation 17

Coefficient of Variation

Assessing the equality of microarray scans and individual spots within an array is an important part of scanning and analyzing arrays. A useful metric for this purpose is the coefficient of variation (CV) of the ratio distribution, which is simply $$CV = \frac{R_{SD}}{\bar{R}}$$ Equation 18

Figure 2:
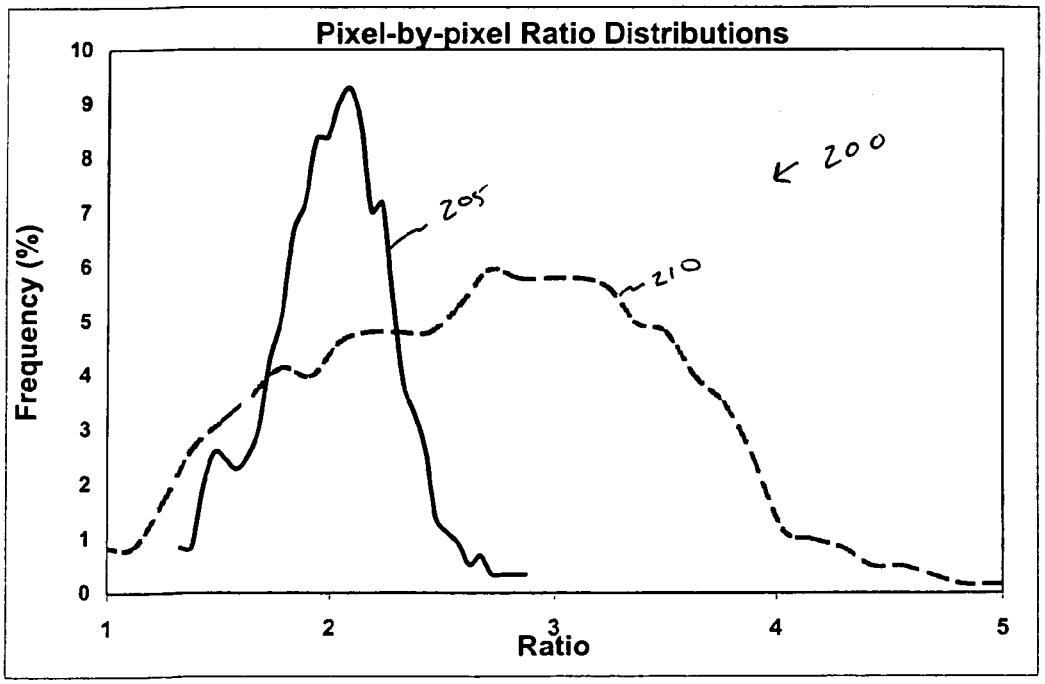
FIG. 2 is a graph illustrating the distribution of ratios calculated for each pixel of several spots according to one embodiment of the present invention.

In effect, the CV represents the experimental resolution of the gene expression ratio. Minimizing the CV should be the goal of scanning and analyzing gene expression ratio experiments. Minimization of $R_{SD}$ is the best way to improve gene expression resolution. The graph 200 in FIG. 2 gives two examples of comparisons between scanned images. The ratios of a first spot are shown in line 205, while the ratios of a second spot are shown as line 210. The first spot has a CV of 0.21, while the second spot has a CV of 0.60. The distribution of the ratios in the first spot 205 have a narrower distribution than the ratios of the second spot 210. Thus, the first spot is a better spot to analyze.

Equation 16 shows that the variability of the ratio decreases dramatically as a function of g, which is a well understood phenomenon. Dividing by a noisy measurement that is near zero produces a very noisy result.

The ratio variance has an interesting dependence on the covariance $\sigma_{rg}$. Large values of $\sigma_{rg}$ reduce the variability of the ratio. This dependence on the covariance is not widely known. In the case of microarray images, strong covariance of the numerator and denominator is a result of three properties of the image data: good alignment of the numerator and denominator images, genuine patterns and textures in the spot images, and a good signal-to-noise ratio ($\bar{r}/r_{SD}$ and $\bar{g}/g_{SD}$).

Table 1 summarizes how variables combine to reduce $R_{SD}$.

TABLE 1

A short summary of the direction that variables need to move in order to reduce the ratio distribution variance.

| Variable | $R_{SD}$ Reduction |
|---|---|
| g | ↑ |
| r | ↓ |
| $g_{SD}$ | ↓ |
| $r_{SD}$ | ↓ |
| $\sigma_{rg}$ | ↑ |

Spot CV

Figure 3:
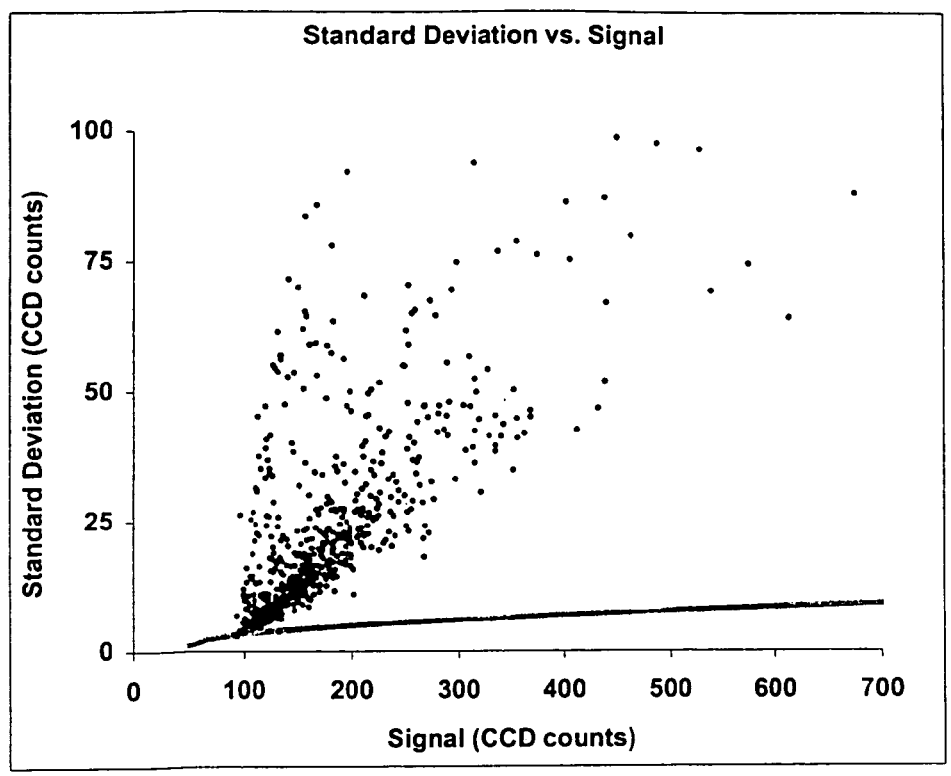
FIG. 3 is a graph illustrating the spot intensity standard deviation plotted against the average signal.

The CV is a fundamental metric and represents the spread of the ratio distribution relative to the magnitude of the ratio. FIG. 3 shows that even though the second spot has a higher ratio than the first spot, the CV is 3× higher. The uncertainty of the second spot's ratio is far greater than the first spot's ratio. Thus, in addition to being useful for separating spots from the control population, the CV can also serve as an independent measure of a spot's quality.

Average CV

The average CV of the entire array of spots gives an excellent metric of the entire array quality. Scans from array WoRx alpha systems have been shown to have approximately ¾ the average CV of a corresponding laser scan.

Normalized Covariance

Covariance is known to be an indicator of the registration among channels, as well as the noise. Large covariance is normally a good sign. Low covariance, however, doesn't always mean the data are bad; it may mean that the spot is smooth and has only a small amount of intensity variance. Likewise, high variance is not necessarily bad if the variance is caused by a genuine intensity pattern within the spot. FIG. 3 demonstrates that standard deviation increases with increasing spot intensity; the dependence is approximately linear. FIG. 3 also shows that the observed standard deviation is not simply caused by the statistical noise associated with counting discrete events (statistical noise). Spots that have a substantial intensity pattern caused by non-uniform distribution of fluorescence will have a large variance and a large covariance (if the detection system is well aligned and has low noise).

Thus, to make the covariance and the variance values useful they must be normalized somehow. In general, this can be accomplished by dividing the covariance by some measure of the spot's intensity variance. To determine the spot's variance, one could select one of the channels as the reference (for example the control channel, which is green), or one could use a combination of the variance from all channels. The following table gives examples of the normalized covariance calculation:

| Normalization Method | Normalized covariance calculations | |
|---|---|---|
| Variances added in quadrature | $\sigma'_{rg} = \frac{\sigma_{rg}}{\sqrt{\sigma_r^2 + \sigma_g^2}}$ | Equation 19 |
| Variances added | $\sigma'_{rg} = \frac{\sigma_{rg}}{\left[\frac{(\sigma_r + \sigma_g)}{2}\right]}$ | Equation 20 |
| Control channel variance only | $\sigma'_{rg} = \frac{\sigma_{rg}}{\sigma_g}$ | Equation 21 |
| Experiment channel variance only | $\sigma'_{rg} = \frac{\sigma_{rg}}{\sigma_r}$ | Equation 22 |

Where $\sigma'_{rg}$ is the normalized covariance, and $\sigma_r$, and $\sigma_g$ are the variance of channels 1 and 2, respectively.

Figure 4:
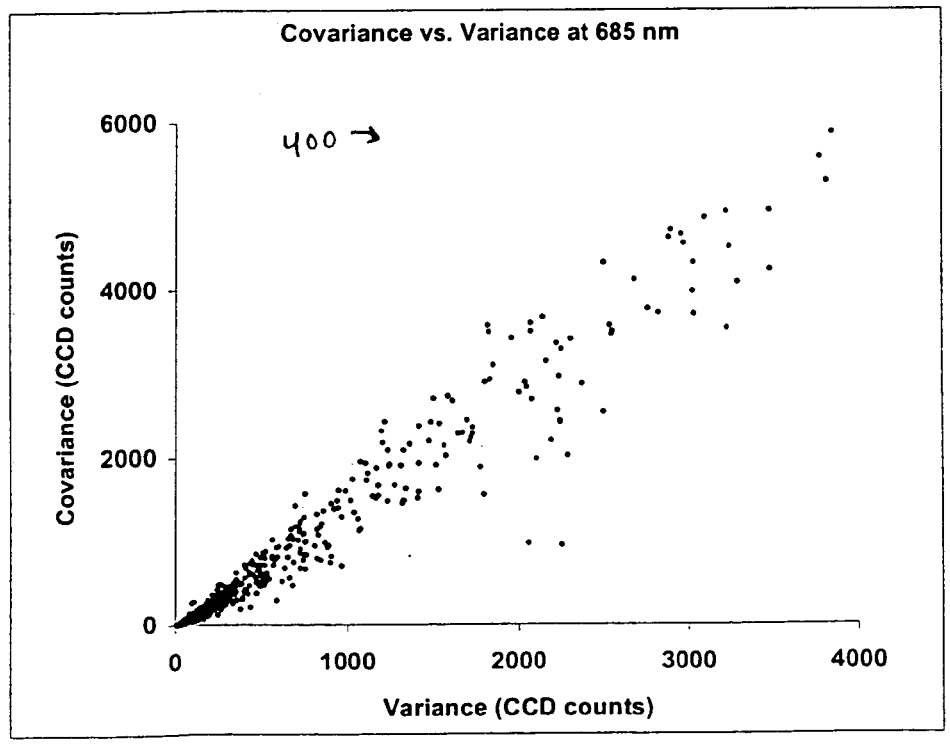
FIG. 4 is a graph plotting covariance as a function of variance according to one embodiment of the invention.

FIG. 4 illustrates a plot 400 of all the spot's covariance values versus their average variance (as in equation 20). The plot of FIG. 4 reveals that the normalized covariance is a very consistent value. The slope of the points in FIG. 4 gives the typical value of the normalized covariance. (The average of the normalized covariance would give a similar result.) Outliers on the graph are almost always below the cluster of points along the line. Such outlying points occur when the intensity variance of the spot is unusually high, relative to the covariance. A study of these points shows that they have some sort of defect, which is often a bright speck of contaminating fluorescence.

Covariance/Variance Correlation of the Entire Array

Systematically poor correlation between covariance and variance can also point to the scanner's inability to measure covariance due to poor resolution, noise, and/or channel misalignment. Linear regression of the points in FIG. 4 gives an indication of the scanner's ability to measure covariance. A broad scatter plot obviously indicates poor correlation: the variance of the spot intensities is inconsistent between the channels. A low slope indicates that the scanner has relatively high variance, relative to it's ability to measure covariance. Thus, one could compare scanners by comparing the slope and correlation coefficient of a linear regression of FIG. 4 (when the same slide is scanned). A good scanner has a tight distribution with large slope and outliers indicate array fabrication quality problems rather than measurement difficulties. The average and standard deviation of the normalized covariance give similar results and could be used instead of the slope and correlation coefficient, respectively.

Spot Intensity Close to Local Background

Spots that are close, or equal, to local background may be indistinguishable from background. A statistical method is employed to determine whether pixels within the spot are statistically different than the background population.

Spot Intensity Below Local Background

Spot intensities below the local background are a good example of how the local backgrounds are not additive. Such spots are not necessarily bad, but are certainly more difficult to quantify. This is a case where proper background determination methods are essential. The method described above can make use of such spots, provided that there is indeed signal above the true calculated background.

Ratio Inconsistency (Alignment Problem or "Dye Separation")

This metric compares the standard method of measuring the intensity ratio with an alternative method. The standard method uses the ratio of the average intensities, as described above. The alternative measure of ratio is the average and standard deviation of the pixel-by-pixel ratio of the spot. For reasonable quality spots, these ratios and their respective standard deviations are similar.

There are two main source causes of inconsistency. Either the slide preparation contains artifacts that affect the ratio, or the measurement system is unable to adequately measure the spot's intensity. The following table lists more details about each source of inconsistency.

| Slide Preparation | Measurement Problems |
|---|---|
| Probe separation | Noise |
| Target separation | Misregistration |
| Contamination with fluorescent material | Non-linear response between channels. |

Note that all the problems listed in the table will also reduce the amount of covariance. In the case of slide preparation problems, the ratio inconsistency points to chemistry problems, whereas measurement problems point to scanner inadequacy.

Numerous variations and modifications of the invention will become readily apparent to those skilled in the art. Accordingly, the invention may be embodied in other specific forms without departing from its spirit or essential characteristics.

What is claimed is:

1. A method of determining a background intensity of an image; the method comprising:
    acquiring image data comprising data representative of a plurality of microarray probes;
    for ones of the plurality of microarray probes, extracting an intensity value for each of a plurality of independent parameters;
    responsive to the extracting, performing a regression analysis on a curve fit of one independent parameter versus another; and
    performing a least-squares analysis of the curve fit to determine a background intensity of the image data.

2. The method of claim 1 further comprising determining a ratio of an experimental image to a control image wherein the experimental image is constructed responsive to the acquiring.

3. The method of claim 2 further comprising determining the least squares curve fit from the equation:

$$r_m = R(g_m - g_b) + r_b = Rg_m + k$$

where $r_m$ and $g_m$ are measured values of the images, $r_b$, and $g_b$ are background intensities of the images, and k is a constant.

4. The method of claim 3 further comprising applying a constraint so the background intensities are greater than bias levels associated with the images.

5. The method of claim 3 further comprising applying a constraint so the background intensities create a zero intercept of a linear regression of the equation:

$$(r_m - r_b) = m(g_m - g_b) + b$$

such that b is approximately zero.

6. The method of claim 5 further comprising extracting background subtraction constants.

7. A method of selecting a microarray scan for analysis; the method comprising:
    acquiring, during a microarray scan, data representative of a plurality of microarray probes;
    determining a coefficient of variation for the microarray scan;
    comparing the coefficient of variation to a predetermined threshold; and
    selecting a microarray scan for analysis if the coefficient of variation is lower than the predetermined threshold.

8. The method of claim 7 further comprising determining the coefficient of variation from the equation:

$$CV = \frac{R_{SD}}{R}$$

where $$R_{SD} \approx \sqrt{g_{SD}^2 \frac{\bar{r}^2}{\bar{g}^4} + \frac{r_{SD}^2}{\bar{g}^2} - 2\sigma_{rg}\frac{\bar{r}}{\bar{g}^3}}.$$

9. The method of claim 7 further comprising determining a spot coefficient of variation for each of the plurality of microarray probes responsive to the acquiring.

10. The method of claim 7 further comprising determining an average coefficient of variation.

11. A method of extracting data from an image; the method comprising:
determining a covariance and a variance of the image in accordance with data representative of a plurality of imaged microarray probes;
normalizing the covariance;
determining an average and a standard deviation of the covariance; and
selecting data to be extracted based on the average and the standard deviation of the covariance.

12. The method of claim 11 further comprising calculating the covariance according to the following equation:

$$\sigma_{rg} = \frac{1}{n}\sum_{i=1}^{n}(r_i - \bar{r})(g_i - \bar{g}).$$

13. The method of claim 11 further comprising normalizing the covariance by adding the variances in quadrature according to the following equation:

$$\sigma'_{rg} = \frac{\sigma_{rg}}{\sigma_r},$$

where $\sigma'_{rg}$ is a normalized covariance and $\sigma_r$ and $\sigma_g$ are variances of a control channel and an experimental channel.

14. The method of claim 11 further comprising normalizing the covariance by adding the variances according to the following equation:

$$\sigma'_{rg} = \frac{\sigma_{rg}}{\left[\frac{(\sigma_r + \sigma_g)}{2}\right]},$$

where $\sigma'_{rg}$ is a normalized covariance and $\sigma_r$ and $\sigma_g$ are variances of a control channel and an experimental channel.

15. The method of claim 11 further comprising normalizing the covariance by using a control channel variance according to the following equation:

$$\sigma'_{rg} = \frac{\sigma_{rg}}{\sigma_g},$$

where $\sigma'_{rg}$ is a normalized covariance and $\sigma_r$ and $\sigma_g$ are variances of a control channel and an experimental channel.

16. The method of claim 11 further comprising normalizing the covariance by using an experimental channel variance according to the following equation $$\sigma'_{rg} = \frac{\sigma_{rg}}{\sigma_r},$$

where $\sigma'_{rg}$ is a normalized covariance and $\sigma_r$ and $\sigma_g$ are variances of a control channel and an experimental channel.

17. A method of extracting data from an image; the method comprising:
determining a covariance and a variance of the image in accordance with data representative of a plurality of imaged microarray probes;
determining a slope of the covariance plotted against the variance; and
selecting data to be extracted where the slope exceeds a predetermined threshold.

18. The method of claim 17 further comprising plotting each covariance value versus an average variance value.

19. The method of claim 17 further comprising ignoring data points not along the slope of the covariance plotted against the variance.

20. The method of claim 17 further comprising performing linear regression of the covariance plotted against the variance to create a distribution of data points.

21. The method of claim 20 further comprising selecting an image having a tight distribution of data points.

* * * * *